3,280,171
PHENYLPROPOXYARALKYL AMINES AND
CARBAMATES
Frank M. Berger, Princeton, and Bernard J. Ludwig,
North Brunswick, N.J., assignors to Carter-Wallace,
Inc., New York, N.Y., a corporation of Maryland
No Drawing. Original application July 17, 1963, Ser. No.
295,807, now Patent No. 3,245,878, dated Apr. 12,
1966. Divided and this application Feb. 4, 1966, Ser.
No. 525,109
7 Claims. (Cl. 260—471)

This application is a divisional application of application Serial No. 295,807, now Patent No. 3,245,878, filed July 17, 1963, which is a continuation-in-part application of application Serial No. 164,856, filed January 9, 1962, now abandoned, which in turn was a continuation-in-part application of application Serial No. 83,954, filed January 23, 1961, also abandoned.

The present invention relates to novel phenylpropoxyamine compounds and to novel compositions for lowering blood cholesterol in warm-blooded animals.

The compounds of the present invention can be represented by the general formula:

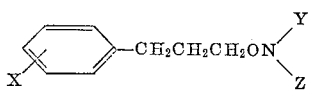

wherein X is hydrogen or lower alkyl; Y is hydrogen or

wherein R is alkyl or aryl; and Z is aralkyl.

As indicated hereinbefore, the compounds of the present invention when taken internally have the effect of lowering the blood cholesterol content, e.g., the amount of cholesterol in the blood of the warm-blooded animal taking the active ingredients of the present invention.

When the present compounds are amines, that is, when Y is hydrogen, they may also be employed in the form of their physiologically acceptable salts such as the hydrohalides (preferably the hydrochloride), salts with other readily tolerated inorganic acids such as sulfuric or phosphoric acid, and salts with the commonly used organic acids such as acetic, citric, maleic, and tartaric acid.

In forming the novel compositions of this invention, the active ingredient is incorporated in a suitable carrier such as, for example, a pharmaceutical carrier, beverage or foodstuff. Any suitable pharmaceutical carrier may be used for formulating the compositions of this invention, such as, for example, starch, lactose, glucose, sucrose, gelatin, powdered licorice, powdered marshmallow, powdered tragacanth, malt, rice flour, powdered althea, magnesium carbonate, chalk, and the like. Among the liquid pharmaceutical carriers which may be utilized are ethyl alcohol, propylene glycol, polyethylene glycol, water, saline, glycerine and water mixtures, glucose syrup, honey, mucilage of acacia, syrup of acacia, mucilage of tragacanth, glyceride of starch, etc. Also, the active ingredient may be incorporated in a foodstuff such, for example, as incorporating it in butter, margarine and the like. The preferred carrier for a given active ingredient depends upon the desired use and nature of the active ingredient. For example, a liquid active ingredient is preferably administered in the form of a soft gelatin capsule containing a therapeutic dose of the active ingredient. A crystalline solid active ingredient is preferably administered in the form of a capsule or tablet. When the composition of this invention is in the form of a solid, the active ingredient is generally in an amount from about 25 to 95% by weight of the solid composition. When the composition of this invention is in the form of a solution, the active ingredient is generally in an amount of from about 0.1 gram to 90 grams per 100 grams of solution.

An in vivo technique which has been valuable in the determination of cholesterol lowering action of drugs is the procedure of Cuthbertson, et al., 1959 (Brit. J. Nutrition, volume 13, page 227). Using the formulation given by these investigators, a stock diet (A) which is essentially normal rodent diet comparable to that available from commercial feed dealers, and a special high fat diet (B) are prepared. The "B" diet features 2% cholesterol; 0.5% cholic acid; and specially prepared hydrogenated arachis oil, 22%; also corn starch, 45.5%; crude casein, 25%; choline chloride, 1%; and salt and vitamin mixtures. The hydrogenated arachis oil specifies a 92° F. melting point with limits of 90–93° F. Drugs to be evaluated are added to diet B at fixed graded concentrations in the diet, ranging from 0.125 to 2%. Male Charles River albino weanling rats weighing approximately 50 grams are placed in individual cages equipped with specially designed self-feeder devices which permit accurate determination of daily food intake. Groups of six animals, kept in individual cages, receive each of the concentrations of drugs. In addition, a group of six on the stock diet (A) serves as a negative control, and a high fat diet (B) group of six serves as a positive control. The rats are placed on the special diets for fourteen consecutive days, after which time one to three milliliter blood samples are obtained by intracardiac puncture, and subjected to assay for their cholesterol content. The animals serving as the negative control group (diet A) maintain a cholesterol level in the normal range which is less than 100 mg./100 ml. of serum, whereas the positive control group (diet B) show a marked elevated level of the order of 800 mg./100 ml.

The active ingredients used in accordance with this invention, when incorporated in diet B following the above described Cuthbertson et al. method, exhibit a cholesterol lowering activity. In general, when such active ingredients are in concentrations of about 0.25 to about 0.5% in diet B, the percent reduction in the blood cholesterol level is about 25% or more as compared to the positive control (diet "B") without the active ingredient. Thus, if a positive control group given diet B shows a blood cholesterol level of about 800 mg./100 ml., the active ingredients of this invention, if incorporated in such diet B, in a concentration of about 0.25 to about 0.5%, would generally reduce the blood cholesterol level of this positive group to about 600 mg./100 ml. or lower. Effective drugs usually show a direct relationship between the concentration of drug in the diet, and the percent reduction in the blood cholesterol levels as compared to the positive control (diet B without drug).

A number of compositions found to exhibit outstanding activity in lowering blood cholesterol levels, when tested by the in vivo procedure of Cuthbertson et al. method described hereinbefore in detail, are shown in Table A. In each instance, the carrier was diet B containing the active ingredient in a concentration of 0.25 percent. The activity (% cholesterol lowering) was obtained in the manner described hereinbefore, i.e., determining the percent reduction in the blood cholesterol levels by incorporating the active ingredient in diet B as compared to diet B without the active ingredient.

TABLE A

| Compound No. | Compound | Percent Reduction |
|---|---|---|
| 1 | N-benzyl-N-(γ-phenylpropoxy)-amine hydrochloride. | 55 |
| 4 | γ-Phenylpropyl N-benzyl carbethoxyhydroxamate. | 75 |
| 6 | γ-Phenylpropyl N-γ-phenylpropyl carbethoxyhydroxamate. | 79 |

In preparing the novel phenylpropyl carbethoxyhydroxamate compounds of this invention, hydroxyurethane is reacted with the appropriate phenylpropyl halide under the influence of alkali in alcoholic solution. By varying the molar ratio of the phenylpropyl halide to the hydroxyurethane employed one can obtain:

(1) The phenylpropyl carbethoxyhydroxamate substantially exclusively, or (2) a mixture of this compound and the corresponding phenylpropyl N-phenylpropyl carbethoxyhydroxamate, or (3) the phenylpropyl N-phenylpropyl carbethoxyhydroxamate substantially exclusively.

In general, an equimolar ratio of the reactants leads to the phenylpropyl carbethoxyhydroxamate compound while the use of a 2:1 molar ratio of the phenylpropyl halide to hydroxyurethane gives essentially the phenylpropyl N-phenylpropyl carbethoxyhydroxamate. Such latter procedure is preferred to produce carbethoxyhydroxamate compounds which contain two identical phenylpropyl groups.

Alternately, novel phenylpropyl carboalkyl(aryl)oxyhydroxamates of this invention can be obtained by the reaction of an appropriate phenylpropoxyamine with an alkyl or aryl chloroformate in a suitable inert organic solvent medium. Similarly, novel phenylpropyl N-aralkyl carboalkyl(aryl)oxyhydroxamates can be prepared from N-aralkyl phenylpropoxyamines and the appropriate chloroformate.

Moreover, novel phenylpropyl N-aralkyl carboalkyl (aryl)oxyhydroxamates of this invention may be obtained by the reaction of the appropriate phenylpropyl carboalkyl(aryl)oxyhydroxamate with a suitable aralkyl halide in alcoholic solution in the presence of alkali. Such reaction is operable in the production of carboalkyl(aryl) oxyhydroxamate compounds wherein Z in the general formula is any aralkyl radical, including γ-phenylpropyl.

The N-aralkyl phenylpropoxyamine compounds of this invention may be obtained by alkaline hydrolysis of the corresponding carbethoxyhydroxamate.

The following are specific examples for the preparation of active ingredient compounds and therapeutic compositions formed in accordance with this invention.

EXAMPLE I

Preparation of N-(m-methylbenzyl)-N-[γ-(p-tolyl)-propoxy]-amine

COMPOUND 3

(A) To a solution of sodium ethylate prepared from 23 grams of sodium metal and 1000 ml. of anhydrous ethanol there was added 105 grams of N-hydroxy urethane and 213 grams of 1-bromo-3-(p-tolyl)-propane and the mixture was refluxed for four hours. A major portion of the ethanol solvent was then removed by distillation at atmospheric pressure until the head temperature reached 86° C. To the cooled residue there was added 250 ml. of water and 250 ml. of ether, the ether layer was separated and the aqueous layer was extracted with an additional 200 ml. of ether. The pooled ether extracts were washed with water until neutral and dried over sodium sulfate. The ether was removed and the residue distilled in vacuo. There was obtained 118 grams of γ-(p-tolyl)-propyl carbethoxyhydroxamate having the following physical properties: B.P. 155°/0.3 mm. $n_D^{25}$ 1.5060.

Analysis.— (for $C_{13}H_{19}NO_3$): Calculated: C, 65.80; H, 8.07; N, 5.90. Found: C, 65.97; H, 8.14; N, 6.12.

(B) 35.1 grams of the above γ-(p-tolyl)-propyl carbethoxyhydroxamate was added to a solution of sodium ethylate prepared from 3.4 grams of sodium metal and 200 ml. of anhydrous ethanol. To the reaction mixture there was then added 27.4 grams of m-xylyl bromide and the mixture was refluxed for four hours. At the end of such period a solution of 12.8 grams of sodium hydroxide in 130 ml. of water was added to the reaction mixture and refluxing was continued for an additional period of two hours. The ethanol was removed by distillation at atmospheric pressure until the head temperature reached 86° C. and the cooled residue was extracted with 500 ml. of ether. The ether extract was washed with water until neutral and dried over sodium sulfate. The ether was removed and the residue distilled in vacuo. The fraction boiling at about 142°/0.08 mm. consisted of the desired N-(m-methylbenzyl) - N - [γ - (p-tolyl)-propoxy]-amine. The yield was 29.6 grams.

EXAMPLE II

Preparation of γ-(p-tolyl)-propyl-N-m-methylbenzyl carbophenoxyhydroxamate

COMPOUND 5

To a solution of 3.0 grams of pyridine and of 10.2 grams of N-(m-methylbenzyl-N-[γ-(p-tolyl)-propoxy] amine, prepared as described in Example I, in 100 ml. of anhydrous ether there was added, in three portions, 5.9 grams of phenyl chloroformate. The reaction temperature was maintained below 35° C. during the addition by external cooling means. The mixture was kept at room temperature overnight. To the mixture there was added 150 ml. of ether and 75 ml. of water, the ether layer was separated and the aqueous layer was further extracted with 100 ml. of ether. The combined ether extracts were washed with 5% hydrochloric acid and then with water until neutral. The ether solution was dried over sodium sulfate and the ether was removed in a rotary evaporator. The residue was heated under a pressure of 0.07 mm. until the temperature of the vapors reached 90° C. and then distilled in vacuo in a molecular distillation unit. There was obtained 10.5 grams of the desired product at a bath temperature of 159° C. and at a pressure of 0.001 mm.

EXAMPLE III

Preparation of λ-Phenylpropyl-N-phenylpropyl carbethoxyhydroxamate

COMPOUND 6

To a sodium ethylate solution preparated from 23 grams of sodium metal and 700 ml. of anhydrous ethanol there was added in succession 105 grams of N-hydroxyurethane and 199 grams of γ-bromopropylbenzene. The mixture was then heated to reflux for ten hours. The inorganic salts were removed by filtration and a major portion of the ethanol was removed by distillation until the vessel temperature reached 85° C. The cooled residue was diluted with 200 ml. of water and the aqueous mixture was extracted with 500 ml. of ether. The ether extract was washed with small quantities of dilute sodium hydroxide solution until the color test with ferric chloride was negative, then washed with small quantities of water until neutral and dried over sodium sulfate. The ether solvent was removed and the oily residue distilled in vacuo. The fraction collected at 138° C./0.2 mm. consisted of 102 grams of γ-phenylpropyl carbethoxyhydroxamate, $n_D^{25}$ 1.5070.

Analysis.—(for $C_{12}H_{17}NO_3$) was as follows: Calculated: C, 64.55; H, 7.67; N, 6.27. Found: C, 64.37; H, 7.20; N, 6.46.

Continued distillation of the residue yielded 41 grams of γ-phenylpropyl N-(γ-phenylpropyl) carbethoxyhydroxamate, B.P. 182° C./0.2 mm.

The physical constants of the compounds prepared in

Examples I–III, as well as those of other compounds of the invention which can be prepared by substantially similar methods, are summarized in Table B given hereinafter.

TABLE B

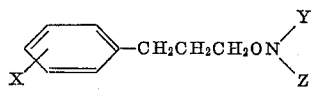

| No. | X | Y | Z | Formula | M.P. or B.P./mm. | $nD_{25}$ | Calculated C | Calculated H | Calculated N | Found C | Found H | Found N |
|---|---|---|---|---|---|---|---|---|---|---|---|---|
| 1 | H | H | Benzyl | $C_{16}H_{20}ClNO$[1] | 90–91 | | 69.18 | 7.26 | 5.04 | 69.23 | 7.01 | 4.91 |
| 2 | H | H | γ-Phenylpropyl | $C_{18}H_{23}NO$ | 159/0.02 | 1.5445 | 80.25 | 8.60 | 5.20 | 80.09 | 8.71 | 5.33 |
| 3 | p-CH₃ | H | m-Methylbenzyl | $C_{18}H_{23}NO$ | 142/0.08 | 1.5449 | 80.25 | 8.60 | 5.20 | 80.12 | 8.56 | 5.20 |
| 4 | H | COOC₂H₅ | Benzyl | $C_{19}H_{23}NO_3$ | 153/0.08 | 1.5326 | 72.82 | 7.40 | 4.47 | 73.16 | 7.40 | 4.59 |
| 5 | p-CH₃ | COOC₂H₅ | m-Methylbenzyl | $C_{25}H_{27}NO_3$ | >159/0.001 | 1.5606 | 77.09 | 6.99 | 3.60 | 77.05 | 7.23 | 3.80 |
| 6 | H | COOC₂H₅ | γ-Phenylpropyl | $C_{21}H_{27}NO_3$ | 182/0.2 | 1.5284 | 73.87 | 7.97 | 4.10 | 73.90 | 8.05 | 4.22 |

[1] Hydrochloride Salt.

The invention in its broader aspects is not limited to the specific steps, methods and compositions described but departures may be made therefrom within the scope of the accompanying claims without departing from the principles of the invention and without sacrificing its chief advantages.

What is claimed is:

1. A compound of the formula:

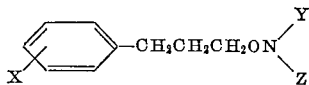

wherein X is selected from the group consisting of hydrogen and lower alkyl; Y is selected from the group consisting of hydrogen and

wherein R is selected from the group consisting of alkyl and aryl; and Z is an aralkyl group.

2. A compound as claimed in claim 1 wherein X is hydrogen, Y is hydrogen and Z is benzyl.

3. A compound as claimed in claim 1 wherein X is hydrogen, Y is hydrogen and Z is γ-phenylpropyl.

4. A compound as claimed in claim 1 wherein X is methyl, Y is hydrogen and Z is methylbenzyl.

5. A compound as claimed in claim 1 wherein X is hydrogen, Y is

wherein R is ethyl, and Z is benzyl.

6. A compound as claimed in claim 1 wherein X is methyl, Y is

wherein R is phenyl and Z is methylbenzyl.

7. A compound as claimed in claim 1 wherein X is hydrogen, Y is

wherein R is ethyl, and Z is γ-phenylpropyl.

No references cited.

LORRAINE A. WEINBERGER, *Primary Examiner.*

A. THAXTON, *Assistant Examiner.*